July 25, 1933.  C. W. JOHNSTON  1,919,947
METHOD OF RECOVERING METALS AND METALLIC OXIDES
Filed May 7, 1929  2 Sheets-Sheet 1
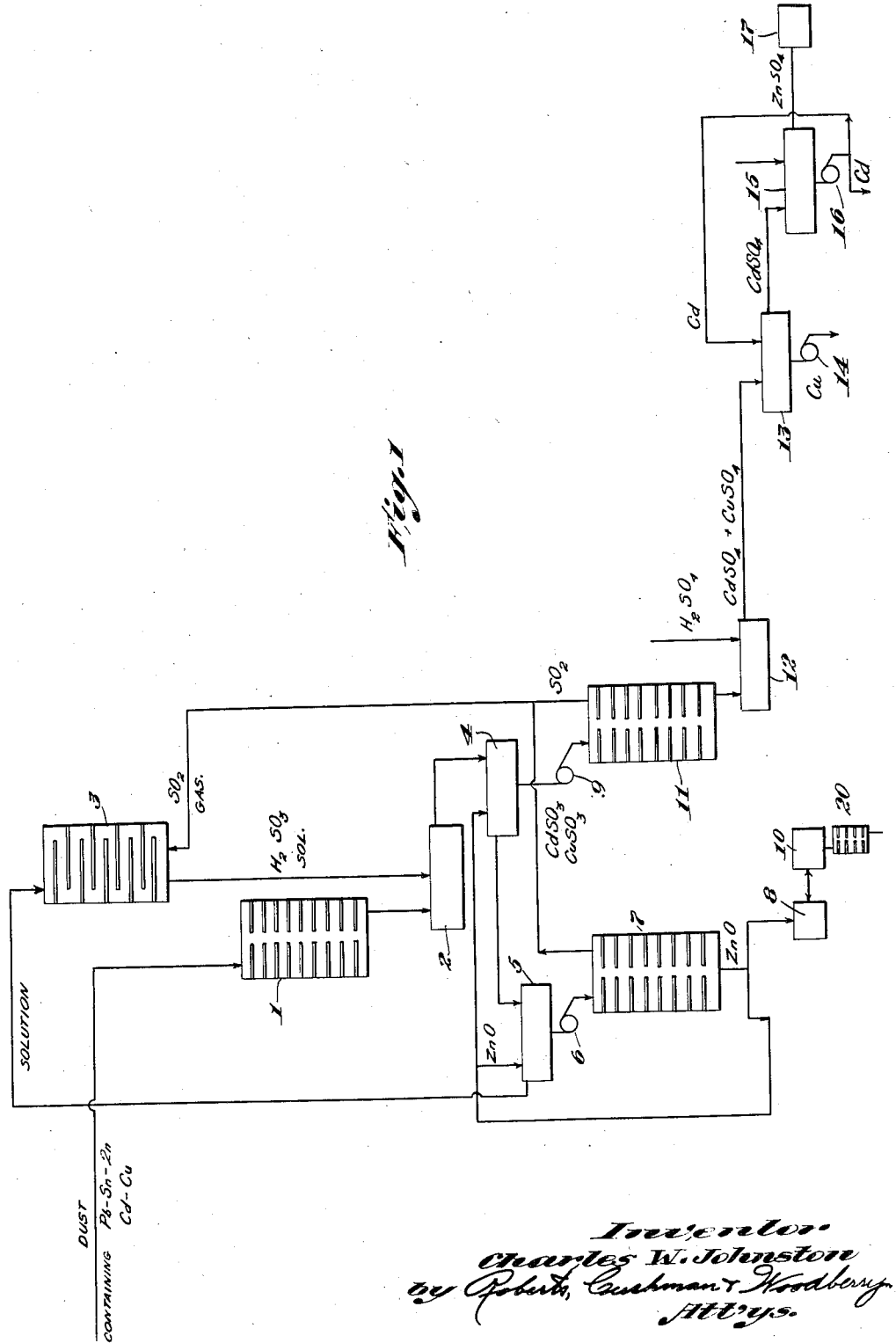

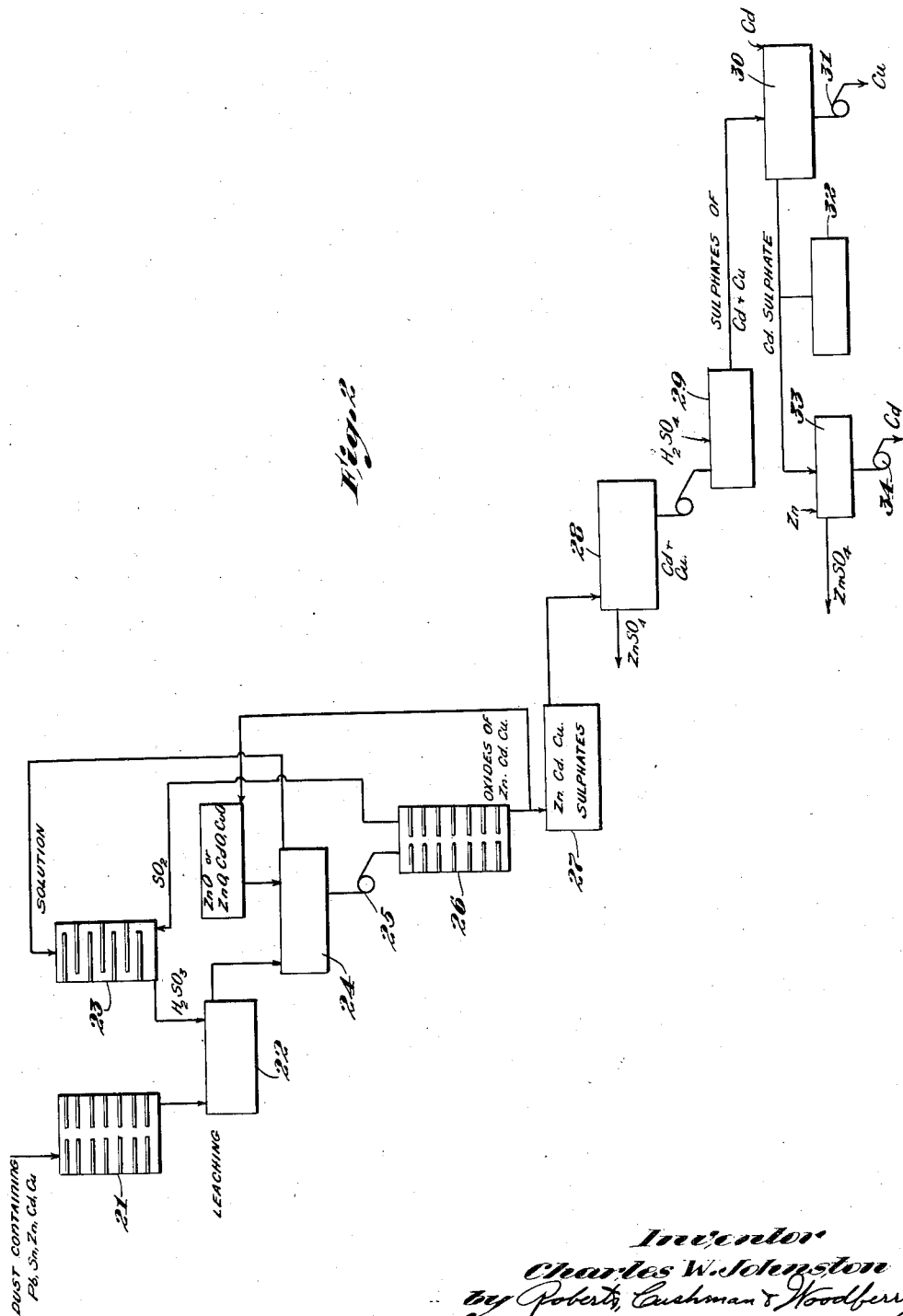

Patented July 25, 1933

1,919,947

UNITED STATES PATENT OFFICE

CHARLES W. JOHNSTON, OF PORTSMOUTH, VIRGINIA, ASSIGNOR TO VIRGINIA SMELTING COMPANY, OF PORTLAND, MAINE, A CORPORATION OF MAINE

METHOD OF RECOVERING METALS AND METALLIC OXIDES

Application filed May 7, 1929. Serial No. 361,202.

This invention relates to a method of treating certain metallic residues such as the dust obtained from electrostatic precipitators, bag-house dust from smelters, and the like, for the separate recovery of the metal or metals which they contain in commercially useful condition.

In various operations of the metal industries, certain by-product materials are obtained which contain relatively large amounts of one or more valuable metals such as lead, tin, zinc, cadmium, copper, and the like. These metals are usually present in the free condition or as their oxides, or both, and in the form of a more or less finely comminuted powder. As such, they are especially suitable for treatment in accordance with the present invention, but if in the form of cakes or lumps, they may readily be crushed or otherwise reduced to convenient size.

Heretofore it has been common practice to leach such residues (with or without a preliminary roast to remove organic matter and a certain amount of chlorine and sulfate sulfur which is often present) with sulfuric acid. This takes into solution the zinc, cadmium, and copper, but leaves the major part of the tin and lead undissolved. The lead and tin residues are largely converted to sulfates by this treatment. This consumes an important amount of sulfuric acid and also leaves these metals in a condition which makes their further treatment by smelting both difficult and expensive.

An object of this invention, therefore, is to provide a method of treating such residues economically and conveniently for the separate recovery of the metals which they contain, preferably in a form suitable for marketing or for re-use in the course of the operation of the process, or both. It is a further object of the invention to obtain the zinc content or a portion thereof as the oxide and preferably in a condition in which it shall be useful as a pigment. Other objects of the invention will appear from the following disclosure.

Briefly described, the procedure of the invention includes a preliminary roasting treatment (if necessary) to convert the metals to the oxides, followed by leaching with an excess of sulfur dioxide in aqueous solution to dissolve the zinc, cadmium and copper, as soluble bisulfites, leaving the lead and tin substantially unchanged. The solution thus obtained is separated from the undissolved residue of lead and tin, and may then be treated with an oxide of one or more of the contained metals, preferably in such quantity as to selectively precipitate certain of the bisulfites as the normal sulfites (leaving the remainder in solution) or in excess, thus to precipitate all of the contained metals as the normal sulfites, which are relatively insoluble.

For example, zinc oxide may be added to the bisulfite solution in sufficient quantity to precipitate the cadmium and copper content, leaving substantially all of the original and added zinc in solution as the bisulfite. The insoluble cadmium and copper sulfites may now be separated from the solution, roasted to liberate sulfur dioxide (which is suitable for re-use) and the residual oxides dissolved in sulfuric acid. The resulting solution of cadmium and copper sulfates may then be successively treated with metallic cadmium to precipitate copper and then electrolysed or treated with metallic zinc to yield metallic cadmium. The zinc bisulfite solution may be further treated with zinc oxide to precipitate normal zinc sulfite. This, upon roasting, yields sulfur dioxide and zinc oxide, both of which are suitable for re-use as reagents in the process. Or, a portion or the whole of the zinc oxide may, by successive milling, washing and re-roasting, be obtained in suitable condition for use as a pigment.

If the zinc oxide or a mixture of two or more oxides of the contained metals is added to the original solution of metallic bisulfites in sufficient quantity, substantially all of the contained metals will be precipitated in the form of the insoluble normal sulfites. This composite precipitate may be roasted to liberate sulfur dioxide (which is recycled) leaving a mixture of the metallic oxides. The latter may also be in part recycled for the precipitation of subsequent bisulfite solutions, as above, while the remainder is dissolved in sulfuric acid, forming soluble sulfates. The cadmium and copper may be precipitated from solution by the addition of metallic zinc, separated from the supernatant zinc sulfate solution, again dissolved and then separated from each other, as above described,— while the zinc sulfate solution may be evaporated for the production of the anhydrous salt or electrolysed for production of metallic zinc, or otherwise used.

A specific adaptation of the invention will be described with respect to its application for treating the dust obtained from electrostatic precipitators containing lead, tin, zinc, cadmium and copper. It will be understood, however, that parts of the procedure as herein described and claimed may be omitted or abbreviated in case one or more of such metals be absent from the material under treatment or present in such quantity as to be negligible.

Fig. 1 is a diagrammatic representation of the procedure, in which substantially all of the zinc is recovered as zinc sulfite or zinc oxide, which may be converted to zinc oxide pigment; and Fig. 2 is a diagrammatic representation of the procedure in which the entire zinc content is recovered in the form of zinc sulfate.

Referring to Fig. 1, the dust is first roasted in a suitable roasting furnace 1 in which free metals are largely converted to the oxides, with liberation of volatile components such as sulfur, chlorine, etc., and the combustion of organic materials, which are thus removed and escape. The roasted material consisting substantially of metallic oxides, then passes to a leaching vat 2 where it is treated with an aqueous solution of sulfur dioxide, in excess, preferably either from a storage tank or direct from scrubber 3. The leach liquor thus obtained is decanted into a precipitating vat 4, leaving the undissolved residue (consisting mainly of unaltered metals or insoluble compounds, such as lead and tin) in the leaching vat 2. The leach liquor containing substantially all of the zinc, cadmium, and copper in solution as the corresponding soluble bisulfites, is now treated with sufficient zinc oxide selectively to precipitate the cadmium and copper. This may be practically assured by adding an amount which will also precipitate a small amount of the zinc.

The residual solution (of zinc bisulfite) may now be withdrawn to a second precipitation tank 5 where it is treated with sufficient zinc oxide to precipitate the zinc content (as normal zinc sulfite) which is filtered off at 6 and carried to the roasting furnace at 7 in which it is decomposed into zinc oxide and sulfur dioxide. A part of the zinc oxide from this operation may be returned for use in precipitation tanks 4 and 5, as indicated by the arrows, while the remainder may be withdrawn for repeated treatments in the ball mill 8, washer 10 and re-roaster 20, to produce a zinc oxide of high purity and especially suitable as a pigment in paint, etc., with good plasticity and covering power.

The sulfur dioxide evolved in the roasting furnace 7 may be returned to the scrubber 3 where it is contacted with water (e. g., the solution from precipitation tank 5) to form a fresh sulfurous acid solution for subsequent treatments of fresh charges of material in the leaching vat 2.

The precipitated mixture of cadmium and copper sulfites from tank 4 is passed through a filter 9 where it may be washed, if desired, and the precipitate then introduced into a roasting furnace 11 where it is decomposed by heat into cadmium and copper oxides and sulfur dioxide gas. The latter is returned to the scrubber 3 while the mixture of metallic oxides is passed into leaching tank 12 and leached with sulfuric acid. The resulting solution containing cadmium and copper sulfate is run into tank 13 where it may be treated with metallic zinc to precipitate both cadmium and copper or with metallic cadmium to precipitate copper only. In the latter case, the copper is separated in filter 14 and the cadmium sulfate solution passes to tank 15 where it may be electrolysed to produce metallic cadmium or may be finally treated with zinc to precipitate metallic cadmium which is separated in filter 16 and may be returned for use in tank 13 while the zinc sulfate solution passes off to storage 17 where it may be evaporated to produce zinc sulfate.

In this mode of procedure, it is to be noted that the zinc may be obtained in a separated and purified form as zinc sulfite or as zinc oxide and either of these latter products may be utilized both as a final product and as an intermediate reagent for the precipitation of the cadmium and copper as normal sulfites or of subsequent quantities of zinc. Moreover, both the sulfur dioxide and supernatant solution from tank 5 are recycled for use in the preliminary leaching of the roasted oxides, thus returning to the process any metals that have not been precipitated and the water as well as sulfur dioxide. The lead and tin are left substantially unaffected and hence without appreciable consumption of the reagents used. Besides this, both the lead and tin are in suitable condition for refining operations, while the cadmium and copper are recovered as pure metals.

Referring to Fig. 2, the raw materials, as before, is introduced into a roasting furnace 21 in which it is substantially converted to the oxides of the metals contained and freed from volatile and organic matter. The roasted oxides are then delivered to a leaching tank 22. Here the charge is treated with sulfurous acid solution from storage or from the scrubber 23, preferably in an amount in excess of that required for dissolving the zinc cadmium and copper content. The leach liquor is then withdrawn from the leaching tank (leaving the lead and tin therein, substantially unchanged and in useful form) and passed into precipitation tank 24. Here it may be treated with an excess of zinc oxide alone, or with a mixture of zinc, cadmium and copper oxides, to neutralize the solution and precipitate the entire metal content of the solution as the corresponding normal sulfites which are separated by a filter 25. The supernatant liquor may be returned to the scrubber 23, while the sulfites are passed into the roasting furnace 26 where they are decomposed by heat to the oxides and sulfur dioxide gas. The latter may be returned to the scrubber 23 to form sulfurous acid therein.

The roasted oxides are then charged into the leaching vat 27 where they are treated with sulfuric acid to form a solution of the corresponding sulfates. This is passed to tank 28 wherein the solution may be treated with metallic zinc to precipitate cadmium and copper, the zinc remaining in solution as zinc sulfate which may be withdrawn and dehydrated to produce anhydrous zinc sulfate. [Alternatively, at this state metallic cadmium might be added to precipitate metallic copper, and leave a solution of zinc and cadmium sulfates.]

The separated metallic cadmium and copper may now be dissolved in sulfuric acid in tank 29, the resulting solution being then treated in tank 30 with metallic cadmium to precipitate copper which is withdrawn and may be washed at 31 as cement copper. The residual solution of cadmium sulfate passes to tank 32 where it may be electrolysed for the production of metallic cadmium or treated in tank 33 with free zinc with a like result, the metal being separated and washed at 34 and the zinc sulfate solution being withdrawn.

In this procedure, it is to be remarked that a part of the sulfites or oxides from the roasting furnace 26, may be returned to the precipitation tank 24 for treatment of the initial leach liquor and that the sulfur dioxide and water solution may be recycled for the formation of the initial sulfurous acid solution, thus conserving the reagents required and any metals that have not been precipitated from the solution.

If troublesome impurities accumulate in the recycled solutions a portion of them may be withdrawn from time to time and purified or discarded.

I claim:
1. A method of treating materials containing zinc and cadmium and/or copper, as their oxides, comprising the steps of leaching the same with an excess of sulfur dioxide in aqueous solution, to dissolve the zinc, cadmium and/or copper, and treating the resulting solution with the oxide of one or more of the metals dissolved therein in sufficient quantity to neutralize the solution and selectively to precipitate one or more of the metals contained therein, as normal sulfites.

2. A method of treating materials containing zinc and cadmium and/or copper, as their oxides, comprising the step of leaching the same with an excess of sulfur dioxide in aqueous solution, to dissolve the zinc, cadmium and/or copper, and treating the resulting solution with the oxide of zinc in sufficient quantity to neutralize the solution and selectively to precipitate the metal or metals contained therein as normal sulfites.

3. A method of treating materials containing zinc and cadmium or copper, as their oxides, comprising the step of leaching the same with an excess of sulfur dioxide in aqueous solution, to dissolve the zinc, cadmium and/or copper, and treating the resulting solution with the oxide of zinc in sufficient quantity to precipitate the cadmium and/or copper as normal sulfites.

4. A method of treating materials containing zinc and cadmium and/or copper, as their oxides, comprising the step of leaching the same with an excess of sulfur dioxide in aqueous solution, to dissolve the zinc, cadmium and/or copper, treating the resulting solution with the oxide of zinc in sufficient quantity to precipitate the cadmium and/or copper, separating the supernatant solution therefrom and adding zinc oxide, in excess, to precipitate the zinc content thereof as normal zinc sulfite.

5. A method of treating materials containing zinc and cadmium and/or copper, as their oxides, comprising the step of leaching the same with an excess of sulfur dioxide in aqueous solution, to dissolve the zinc, cadmium and/or copper, treating the resulting solution with the oxide of zinc in sufficient quantity to precipitate the cadmium and/or copper, separating the supernatant solution therefrom and adding zinc oxide, in excess, to precipitate the zinc content thereof as normal zinc sulfite, and roasting said sulfite to produce sulfur dioxide and zinc oxide.

6. A method of treating materials containing zinc and cadmium and/or copper, as their oxides, comprising the step of leaching the same with an excess of sulfur dioxide in aqueous solution, to dissolve the zinc, cadmium and/or copper, treating the resulting solution with the oxide of zinc in sufficient quantity to precipitate the cadmium and/or copper, separating the supernatant solution therefrom, adding zinc oxide, in excess, to precipitate the zinc content thereof as normal zinc sulfite, roasting said sulfite to produce sulfur dioxide and zinc oxide, and finally lixiviating and grinding said oxide to form zinc oxide pigment.

7. A method of treating materials containing zinc and cadmium and/or copper, as their oxides, comprising the step of leaching the same with an excess of sulfur dioxide in aqueous solution, to dissolve the zinc, cadmium and/or copper, treating the resulting solution with the oxide of zinc in sufficient quantity to precipitate the cadmium and/or copper, separating the supernatant solution therefrom, adding zinc oxide, in excess, to precipitate the zinc content thereof as normal zinc sulfite, roasting said sulfite to produce sulfur dioxide and zinc oxide, and recycling a portion of the zinc oxide for said neutralizing and precipitation step.

8. A method of treating materials containing copper and cadmium and/or zinc, as their oxides, comprising the steps of leaching the same with an aqueous soluton of sulfur dioxide, treating the resulting solution with copper, cadmium or zinc oxide, separating and roasting the resulting precipitate, treating the roasted material with sulfuric acid and adding zinc to the liquor thus produced to precipitate cadmium and/or copper, dissolving the copper and/or cadmium precipitate thus formed in an acid, treating the same with free cadmium to precipitate the copper, separating and treating the liquor with free zinc to separate metallic cadmium therefrom, and finally electrolyzing the zinc sulfate solution to produce metallic zinc.

9. A method of treating materials containing copper and cadmium, and/or zinc, as their oxides, comprising the steps of leaching the same with an aqueous solution of sulfur dioxide, treating the resulting solution with copper, cadmium or zinc oxide, and separating and roasting the resulting precipitate.

10. A method of treating materials containing copper and cadmium, and/or zinc, as their oxides, comprising the steps of leaching the same with an aqueous solution of sulfur dioxide, treating the resulting solution with copper, cadmium zinc oxide, separating and roasting the resulting precipitate, treating the roasted material with sulfuric acid, and adding zinc to the liquor thus produced to precipitate copper and cadmium, if present.

11. A method of treating materials containing copper and cadmium, and/or zinc, as their oxides, comprising the steps of leaching the same with an aqueous solution of sulfur dioxide, treating the resulting solution with copper, cadmium or zinc oxide, separating and roasting the resulting precipitate, treating the roasted material with sulfuric acid and adding cadmium to the liquor thus produced to precipitate copper.

12. A method of treating materials containing copper and cadmium, as their oxides, comprising the steps of leaching the same with an aqueous solution of sulfur dioxide, treating the resulting solution with copper, cadmium or zinc oxide, separating and roasting the resulting precipitate, treating the roasted material with sulfuric acid, and adding zinc to the liquor thus produced to precipitate cadmium and copper, dissolving the copper and cadmium precipitate thus formed in an acid and treating the same with free cadmium to precipitate the copper.

13. A method of treating materials containing cadmium and copper, as their oxides, comprising the steps of leaching the same with an aqueous solution of sulfur dioxide, treating the resulting solution with cadmium and/or zinc oxide, separating and roasting the resulting precipitate, treating the roasted material with sulfuric acid, adding zinc to the liquor thus produced to precipitate cadmium and copper, dissolving the copper and cadmium precipitate thus formed in an acid and treating the same with free cadmium to precipitate the copper, separating and treating the liquor with free zinc to separate metallic cadmium therefrom.

14. A method of treating materials containing zinc and cadmium and/or copper, as the oxides, comprising the steps of leaching the same with an aqueous solution of sulfur dioxide, treating the resulting solution with oxides of the metals contained therein, in excess, separating the precipitated normal sulfites from the solution, and decomposing the same by heat to form the corresponding oxides and sulfur dioxide.

15. A method of treating materials containing zinc and cadmium and/or copper, as the oxides, comprising the steps of leaching the same with an aqueous solution of sulfur dioxide, treating the resulting solution with oxides of the metals contained therein, in excess, separating the precipitated normal sulfites from the solution, and decomposing the same by heat to form the corresponding oxides and sulfur dioxide, and returning a portion of said oxides to the precipitation step.

16. A method of treating materials containing zinc and cadmium and/or copper, as the oxides, comprising the steps of leaching the same with an aqueous solution of sulfur dioxide, treating the resulting solution with one or more of the oxides of the metals contained therein, in excess, separating the precipitated normal sulfites from the solution, and decomposing the same by heat to form the corresponding oxides and sulfur dioxide, and returning the sulfur dioxide to the leaching step.

17. A method of treating materials containing zinc and cadmium and/or copper, as the oxides, comprising the steps of leaching the same with an aqueous solution of sulfur dioxide, treating the resulting solution with one or more of the oxides of the metals contained therein, in excess, separating the precipitated normal sulfites from the solution, and decomposing the same by heat to form the corresponding oxides and sulfur dioxide and returning said solution and sulfur dioxide to the leaching step.

18. A method of treating materials containing zinc and cadmium and/or copper, as the oxides, comprising the steps of leaching the same with an aqueous solution of sulfur dioxide, treating the resulting solution with one or more of the oxides of the metals contained therein, in excess, separating the precipitated normal sulfites from the solution, and decomposing the same by heat to form the corresponding oxides and sulfur dioxide, and returning a portion of said oxides to the precipitation step and returning the sulfur dioxide to the leaching step.

19. A method of treating materials containing cadmium and/or copper, as the oxides, comprising the steps of leaching the same with an excess of sulfur dioxide in aqueous solution, treating the resulting solution with zinc oxide in quantity sufficient to precipitate the metals other than zinc, separating the precipitates, and decomposing the same by heat to expel the sulfur dioxide therefrom, to yield cadmium and/or copper oxides, and returning the sulfur dioxide to the leaching step.

20. A method of treating materials containing cadmium and copper, as the oxides, comprising the steps of leaching the same with an excess of sulfur dioxide in aqueous solution, treating the resulting solution with zinc oxide in quantity sufficient to precipitate the metals other than zinc, separating the precipitates, and decomposing the same by heat to expel the sulfur dioxide therefrom, to yield a mixture of cadmium and copper oxides.

CHARLES W. JOHNSTON.